(12) United States Patent
Kennedy

(10) Patent No.: US 9,697,189 B2
(45) Date of Patent: Jul. 4, 2017

(54) PARTIAL WEBSITE OPTIMIZATION FOR A WEB PUBLISHER

(71) Applicant: Instart Logic, Inc., Mountain View, CA (US)

(72) Inventor: Brian Kennedy, Mountain View, CA (US)

(73) Assignee: Instart Logic, Inc., Palo Alto, CA (US)

( * ) Notice: Subject to any disclaimer, the term of this patent is extended or adjusted under 35 U.S.C. 154(b) by 381 days.

(21) Appl. No.: 14/081,931

(22) Filed: Nov. 15, 2013

(65) Prior Publication Data
US 2015/0143224 A1     May 21, 2015

(51) Int. Cl.
  *G06F 17/00* (2006.01)
  *G06F 17/22* (2006.01)
  *G06F 17/30* (2006.01)

(52) U.S. Cl.
  CPC ...... *G06F 17/2247* (2013.01); *G06F 17/2205* (2013.01); *G06F 17/2258* (2013.01); *G06F 17/30899* (2013.01); *G06F 17/30902* (2013.01); *G06F 17/30905* (2013.01)

(58) Field of Classification Search
  CPC ............... G06F 17/24; G06F 17/2247; G06F 17/30905; G06F 17/30902; G06F 17/2258; G06F 17/2205; G06F 17/30899
  See application file for complete search history.

(56) References Cited

U.S. PATENT DOCUMENTS

| | | | |
|---|---|---|---|
| 7,200,644 B1 * | 4/2007 | Flanagan | G06F 17/30899 707/E17.119 |
| 8,234,414 B2 * | 7/2012 | Issa | G06F 17/30902 709/203 |
| 8,438,474 B1 | 5/2013 | Lloyd | |
| 9,055,124 B1 * | 6/2015 | Hill | H04L 65/403 |
| 9,158,845 B1 * | 10/2015 | Reddy | G06F 17/30864 |
| 9,326,189 B2 * | 4/2016 | Luna | H04W 28/06 |
| 2002/0194382 A1 * | 12/2002 | Kausik | G06F 9/54 709/246 |
| 2007/0124480 A1 * | 5/2007 | Heled | G06F 17/30867 709/227 |
| 2007/0245010 A1 * | 10/2007 | Arn | H04L 67/1008 709/223 |
| 2009/0199085 A1 * | 8/2009 | Park | G06F 17/30905 715/234 |
| 2010/0198982 A1 * | 8/2010 | Fernandez | G06Q 30/02 709/231 |

(Continued)

OTHER PUBLICATIONS

Ababneh et al. Cross-layer Optimization Protocol for Guaranteed Data Streaming over Wireless Body Area Networkds, IEEE, 2012, pp. 6.*

(Continued)

*Primary Examiner* — Chau Nguyen
(74) *Attorney, Agent, or Firm* — Van Pelt, Yi & James LLP

(57) ABSTRACT

A method of delivering webpages to a browser includes delivering a first webpage using a streaming protocol that optimizes delivery of content of the first webpage where the first webpage includes information that may persist in a browser cache; delivering a second webpage without using the streaming protocol where the second webpage and the first webpage both reference a first resource; and forcing revalidation of the first resource stored on the browser cache.

17 Claims, 7 Drawing Sheets

(56) References Cited

U.S. PATENT DOCUMENTS

| | | | |
|---|---|---|---|
| 2010/0325357 A1* | 12/2010 | Reddy | G06F 21/53 711/118 |
| 2011/0066676 A1* | 3/2011 | Kleyzit | G06F 17/30902 709/203 |
| 2011/0137973 A1* | 6/2011 | Wei | H04L 67/1008 709/202 |
| 2011/0191445 A1* | 8/2011 | Dazzi | G06F 15/16 709/219 |
| 2015/0089077 A1* | 3/2015 | Acharya | H04L 65/608 709/231 |

OTHER PUBLICATIONS

Julian Seidenberg, "How to improve website performane", Oct. 17, 2012, SilverStripe, pp. 8.*
Janjeet Joshi, "Accelerated Web Content Delivery", Nov. 2010, Architecture Technology Services, HCL Technologies Ltd., pp. 12.*
Nicholas C. Zakas, "How content delivery networks (CDNs) work", Nov. 29, 2011, NCZOnline, pp. 6.*
Anonymous, "http—(Weak) ETags and Last-Modified—Stack Overflow" Jan. 16, 2013, Retrieved at http://stackoverflow.com/questions/3043729/weak-etags-and-last-modified on Jun. 12, 2015.
Fielding et al. "RFC 2616—Hypertext Transfer Protocol—HTTP/1.1" Jun. 1, 1999, Retrieved at http://tools.ietf.org/html/rfc2616 on Jun. 8, 2015.

\* cited by examiner

```
<html>
  <head>
    <title>Welcome</title>
  </head>
  <body>
    <h1>HelloWorld </h1>
        .
        .
        .
    <img src = "url for image"/>         ← Text
    <video>                              ← Image
        <source src = "url for video" type = "video/ogg"  />   ← Video
    </video>
    <script type = "text/javascript">  ⎫
    <!--script                          ⎬ Inline
    *** Some javascript code is placed here ***   JavaScript
    -- >                                ⎭
    </script>

<script src = "myScript.js">       ⎱ External
    </script>                          ⎰ JavaScript </body>
</html>
```

FIG. 2

PARTIAL WEBSITE OPTIMIZATION FOR A WEB PUBLISHER

BACKGROUND OF THE INVENTION

Typically, a web browser needs to receive the dependent resources associated with different links and URLs before it can complete the rendering of a webpage. Furthermore, a web server may need to generate a webpage by integrating static and dynamic content. The startup wait time experienced by an end-user of a browsing session may be insignificant in low-latency networks, such as wired Ethernet networks, but unacceptably long for an end-user in higher-latency networks, such as cellular 3G networks or wireless networks. Therefore, improved techniques for delivering information corresponding to a webpage would be desirable.

BRIEF DESCRIPTION OF THE DRAWINGS

Various embodiments of the invention are disclosed in the following detailed description and the accompanying drawings.

FIG. 2 is a diagram illustrating an embodiment of an HTTP response 200 returning an HTML file.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a method to deliver contents of a webpage forces revalidation of the cache for webpages operating under a streaming protocol. In this manner, for webpages not operating under the streaming protocol, the webpage rendering would not be degraded.

Figure 1:
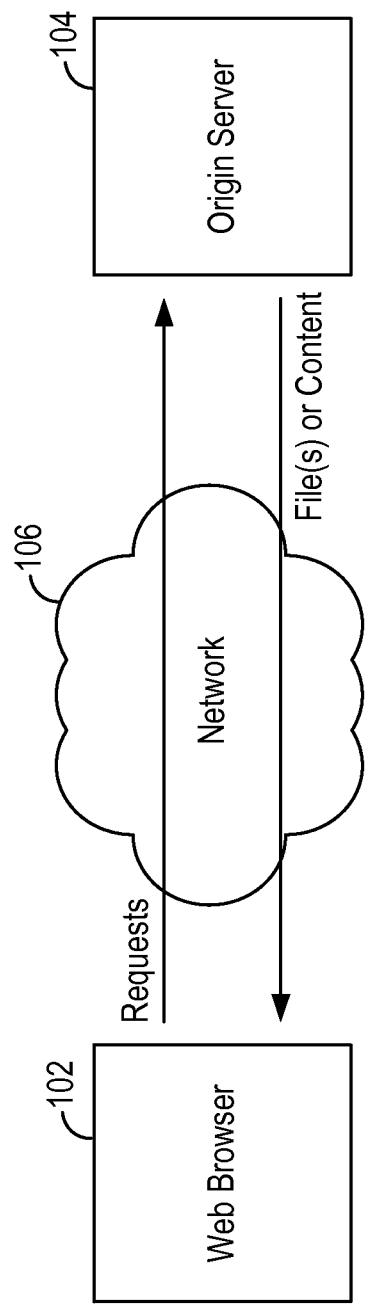
FIG. 1 is a block diagram illustrating an embodiment of a web browser accessing webpages and other information through a network.

FIG. 1 is a block diagram illustrating an embodiment of a web browser accessing webpages and other information through a network. As shown in FIG. 1, a web browser 102 sends a request for a webpage to an origin server 104 (e.g., a web publisher, such as www.yahoo.com and www.cnn.com), and web browser 102 receives the content corresponding to the webpage through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may also be described by different scripting languages, including JavaScript Object Notation (JSON), and the like. The webpage may be described by other custom languages as well. HTML is used hereinafter as an example of the various languages for describing webpages. Note that the examples of HTML are selected for illustrative purposes only; accordingly, the present application is not limited to these specific examples.

FIG. 2 is a diagram illustrating an embodiment of an HTTP response 200 returning an HTML file. To display the webpage, web browser 102 sends a Hypertext Transfer Protocol (HTTP) request message to origin server 104 requesting the HTML webpage file. After origin server 104 locates the requested HTML webpage file, origin server 104 returns the requested HTML webpage file in an HTTP response message to web browser 102. Web browser 102 then parses the received webpage and begins to process and render the webpage.

As shown in FIG. 2, the HTML file may include text, dependent resources, scripts, and the like. Examples of dependent resources include images, videos, audio clips, and APIs (application programming interfaces). These dependent resources are resources that need to be separately transferred from origin server 104 or from other servers to web browser 102. For example, as shown in FIG. 2, the list of dependent resources includes an image, which is stored at a location specified by an URL. To display the image on the webpage, web browser 102 sends a separate HTTP request message to the URL, and the image is returned in a separate HTTP response message from the URL.

The HTML file in FIG. 2 may include one or more scripts for making the webpage dynamic and interactive. For example, scripts may be used to manipulate the webpage's content and behavior or to respond to end-user actions. As shown in FIG. 2, the <script> tags (i.e., <script> and </script> tags) are used to define a client-side script, such as a JavaScript. A JavaScript may be either inline or external. For inline JavaScripts, the JavaScript code is directly embedded and integrated into the HTML code in FIG. 2. JavaScript code may also be placed in external files. For example, external JavaScript files have the file extension .js. An external JavaScript file may be inserted into the HTML file by specifying a URL for the .js file in the "src" attribute of the <script> tag. The external JavaScript is another type of dependent resource, and is downloaded from the URL and then executed.

Figure 3:
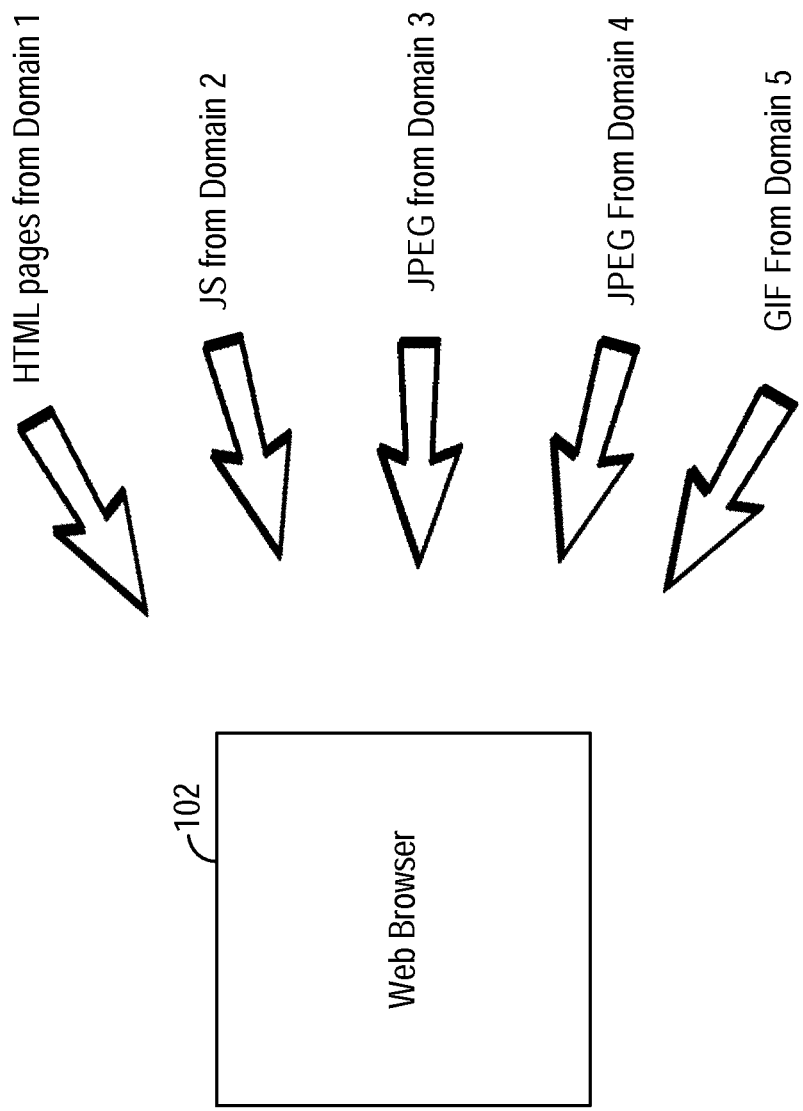
FIG. 3 is a block diagram illustrating that the referenced dependent resources and the webpages of a website may be hosted on multiple domains.

FIG. 3 is a block diagram illustrating that the referenced dependent resources and the webpages of a website may be hosted on multiple domains. As shown in FIG. 3, in a particular website, the HTML webpages of the website may be downloaded directly from the origin server 104 in domain 1, a portion of the JPEG images may be hosted by domain 2, a portion of the JPEG images may be hosted by domain 3, the remaining portion of the JPEG images may be hosted by domain 4, and the GIF images may be hosted by domain 5. Multiple domains are used to serve different dependent resources for different reasons. For example, web browser 102 may open multiple concurrent connections and download more dependent resources in parallel if the dependent resources are hosted on different domains. Furthermore, medium to large websites often move their static content (e.g., image and JavaScript files) to a CDN (content distribution network), because deploying this content across multiple geographically dispersed servers can reduce the download time of this content. As the CDN and origin server 104 have different domain names, the referenced dependent resources and the webpages are hosted on multiple domains.

The various domains associated with the referenced dependent resources of a webpage can be determined by parsing the webpage. For example, with reference to FIG. 2, the image file and the video file are indicated on the webpage as being stored in different locations, each specified by a URL. As each URL includes its domain information, the domains of the image and video files can be determined by parsing their respective URLs.

Figure 4:
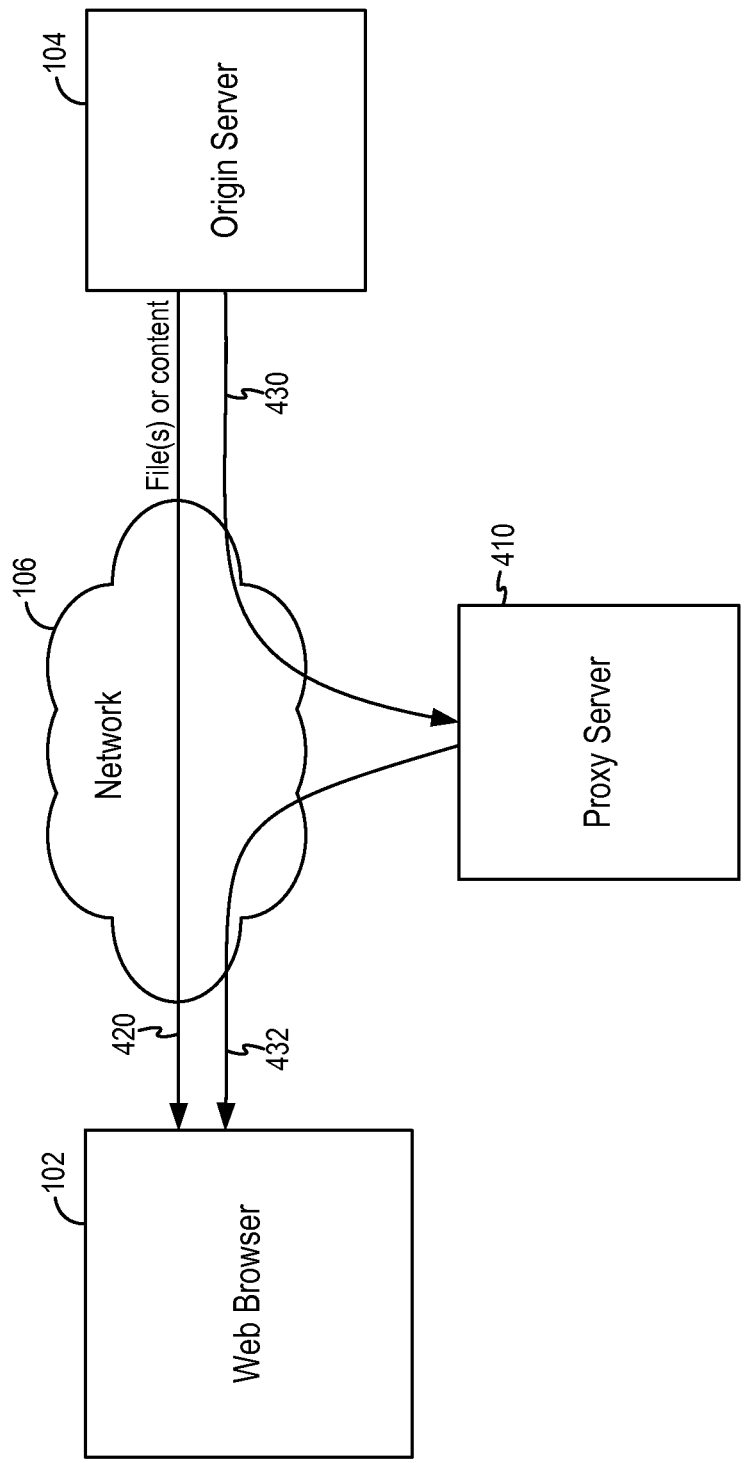
FIG. 4 is a block diagram illustrating a proxy server 410 (e.g., an Instart edge server) used to optimize the delivery of some of the content corresponding to webpages of a website.

FIG. 4 is a block diagram illustrating a proxy server 410 (e.g., an Instart edge server) used to optimize the delivery of some of the content corresponding to webpages of a website. As shown in FIG. 4, arrow 420 indicates that some of the dependent resources and the HTML webpages are delivered to web browser 102 without any optimization by proxy server 410. For instance, for this particular website, HTML webpages and dependent resources downloaded from domain 1, domain 2, and domain 3 are delivered to web browser 102 without any optimization by proxy server 410. This content may be served by origin server 104 or by external CDN nodes that are geographically closer to web browser 102. Arrow 430 indicates that proxy server 410 receives and stores the remaining of the content, and arrow 432 indicates that proxy server 410 further delivers the content to web browser 102 using different optimization techniques.

Proxy server 410 uses different optimization techniques to deliver different types of resources to web browser 102 and speed up the rendering of the webpages in different ways. The optimization techniques include, but are not limited to HTML streaming, techniques for optimizing the delivery of JavaScripts, techniques for optimizing the delivery of JPEG images, PNG images, WebP images, and the like. Each of the optimization techniques may have a different set of configurable parameters.

Figure 5:
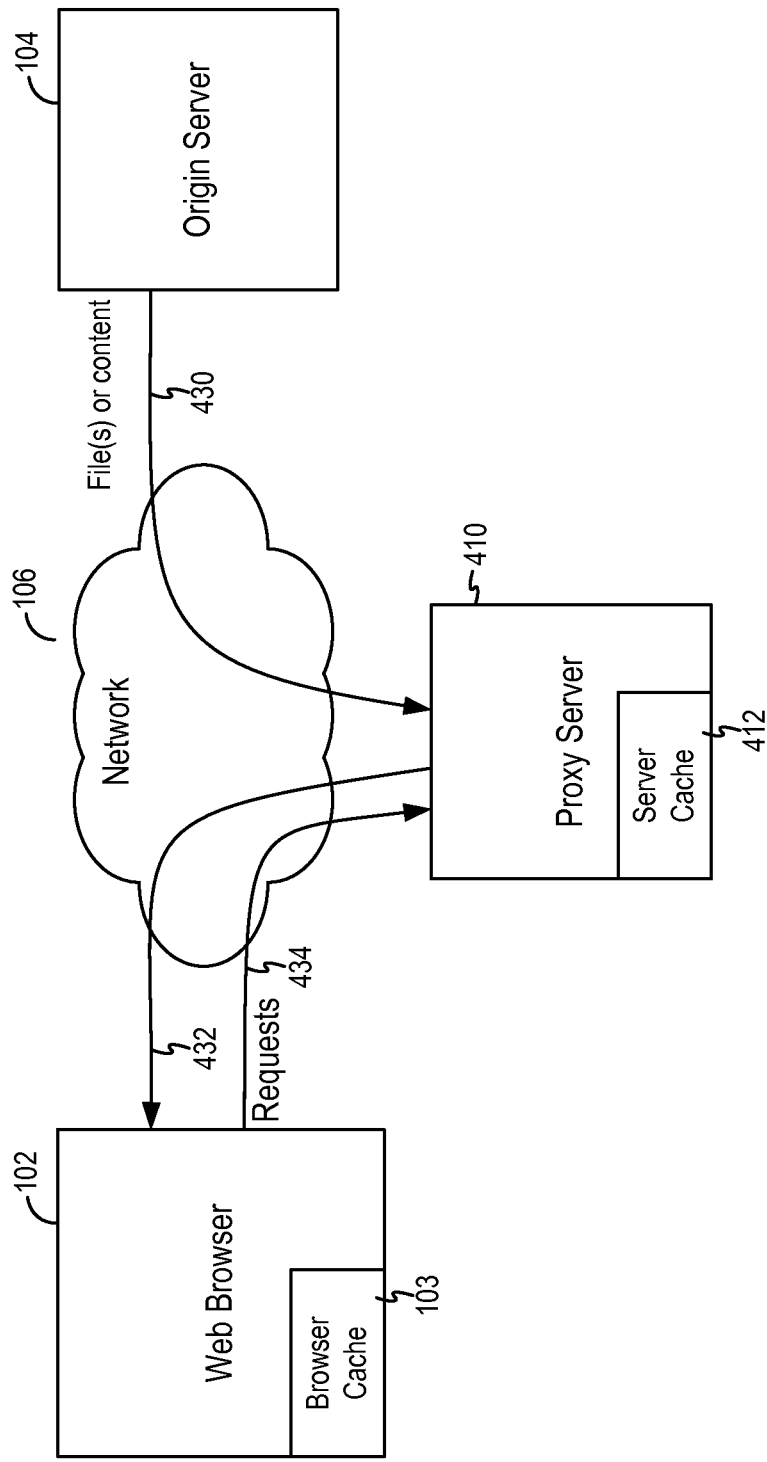
FIG. 5 illustrates a network configuration in which an optimization proxy server is deployed to facilitate delivery of content corresponding to webpages of a website.

FIG. 5 illustrates a network configuration in which an optimization proxy server is deployed to facilitate delivery of content corresponding to webpages of a website. In the example shown in FIG. 5, a website is configured to have all network traffic directed to the website to be routed through the optimization proxy server 410 (or "proxy server 410"). The optimization proxy server 410 applies different optimization techniques to deliver different types of resources to web browser 102 so as to speed up the rendering of the webpages of the website. In some embodiments, the optimization proxy server 410 examines a webpage and injects a client into the webpage to implement one or more optimization techniques. In one embodiment, the optimization proxy server 410 injects a client which implements a streaming protocol that optimizes delivery of content on a webpage. For example, the streaming protocol may stream JPEG images on a webpage to speed up rendering of webpages that may include one or more images from the same or different domains.

In some cases, a website may include webpages having a fair amount of high-fidelity contents, such as high-resolution images, that may benefit from the content delivery optimization techniques provided by the optimization proxy server. Meanwhile, the website may also include webpages where content delivery optimization does not produce appreciable benefit. In that case, injecting the optimization client into all of the webpages may create unnecessary overhead. For example, in an on-line shopping website, the webpages displaying the products may include large amount of high-resolution images while webpages for the checkout process may only have limited amount of low-resolution images. Accordingly, in some configurations, the optimization proxy server 410 analyzes the webpages of a website and injects the optimization client only into webpages that have a large amount of high-fidelity contents, such as a large amount of images. Webpages with a small amount of images or low resolution images do not need content delivery optimization and are not injected with the optimization client. Accordingly, some of the webpages of the website are optimized and will have their content streamed while other webpages are not optimized and the full content is loaded. In the present description, providing content delivery optimization to only a subset of the webpages of a website is referred to as "partial site optimization."

When partial site optimization is employed, image display artifacts can result causing blurry images to appear on the non-optimized webpages. The image display artifact is a result of the use of web browser caching where a streamed or incomplete image may be stored in a browser cache for a first webpage and the browser cache may subsequently serve the incomplete image to a second, non-optimized, webpage as the full content, resulting in the display of a blurry image on the webpage.

Web browser caching operates as follows. Most webpages include resources that change infrequently, such as CSS files, image files, JavaScript files, and so on. These resources take time to download over the network, which increases the time it takes to load a web page. Web browser caching (or HTTP caching) is typically deployed to allow these static resources to be saved, or cached, by a browser. Once a resource is cached, a browser can refer to the locally cached copy instead of having to download the resource again on subsequent visits to the webpage.

Referring again to FIG. 5, the web browser 102 has allocated a memory storage area 103 as the cache memory storage for temporarily storing resources received from the optimization proxy server 410. The proxy server 410 may also include a memory storage area 412 as the cache memory storage for temporarily storing resources received from the origin server 104. Local caching of static resources by the browser 102 is realized by setting cache control directives in the cache-control response header for the requested webpage. In one example, an expiry date or a maximum age for a static resource is set in a HTTP cache-control response header to instruct the browser to load previously downloaded resources from the local cache rather than over the network. More specifically, the cache-control response header includes directives to declare what should be cacheable, what may be stored by caches, modifications of the expiration mechanism, and revalidation and reload controls.

As web resource changes over time, the cached resource therefore has a useful life or "freshness". If the freshness of a resource expires, the cached resource becomes stale. When a stored static resource becomes stale, the browser will issue a request for the updated resource to the proxy optimization server 410. In some cases, the browser issue a validation request to determine whether the cached resource is still valid. When the resource has changed, the proxy optimization server 410 provides the updated resource to the browser 102 to store in the browser cache 103 again.

When partial site optimization and web browser caching are employed, image display artifacts may result when a user navigate to an optimized webpage with a given image and then to a non-optimized page that display the same image. When the browser requests an optimized webpage with the image resource, the optimization proxy server 410 streams the image to the browser and the streamed image is stored in the browser cache. Then, when the user navigates to a non-optimized webpage that has the same image, the browser will fetch the cached image from the browser cache and rendered the streamed image. Because the streamed image may not be the complete image, rendering the streamed image on a non-optimized webpage leads to a blurry or sub-optimal image being displayed, which degrades the user experience.

In embodiments of the present invention, the proxy optimization server 410 implements a cache control method for partially optimized websites. The cache control method ensures that non-optimized webpages will be rendered with the full resolution images to guarantee satisfactory user experience. In some embodiments, the cache control method operates to force revalidation of the cached resource when the browser navigates from an optimized webpage to another webpage that calls for the same resource. In this manner, the full content of the resource is fetched when the browser navigates to a non-optimized webpage and the non-optimized webpage displays images with full resolution and without image display artifacts.

In one embodiment, the cache control method of the present invention is configured to modify the cache-control response header in a response to a request for resource. The cache-control response header is modified in a manner so as to force revalidation of the cached resource. In some embodiments, the cache control method is applied to a HTTP cache-control response header which generally includes the following cache control parameters:

(1) Cache-Control: max-age (typically in seconds). The Cache-Control directive specifies the "freshness lifetime" of a resource, that is, the time period during which the browser can use the cached resource without checking to see if a new version is available from the original server. Once the maximum age "max-age" is set by the cache-control response header and the resource is downloaded, the browser will not issue any GET requests for the resource until the expiry date or maximum age is reached.

(2) Last-Modified (typically in date). The Last-Modified parameter specifies the date the resource was last modified. The Last-Modified parameter is used by the browser to determine if the cached resource is the same as the version on the origin server.

(3) ETag (an alphanumeric character string). The ETag parameter is an identifier used to uniquely identify a resource. For example, the ETag value can be a file version or a content hash of the resource.

The Last-Modified and ETag parameters specify characteristics about the cached resource that the browser can use to determine if the cached resource is the same as the resource on the origin server. For example, a user may explicitly reload a webpage and the origin server (or a proxy server) does not return a full response unless the Last-Modified and ETag parameters indicate that the origin resource has changed since the resource was stored in the cache. When the resource at the origin server has a newer Last-Modified date or a different ETag, the origin server will return the full resource to be stored in the browser cache.

When web browser caching is used, a cached resource is considered fresh if it has an expiry time and it is still within the fresh period. Fresh resources are served directly from the browser cache, without checking with the origin server. If the resource becomes stale, the browser may request validation of the cached resource, that is, the browser asks the origin server (or the proxy server) whether the cached copy it has is still good. Validation avoids sending the entire resource again if the resource has not changed. By using validation, the browser cache avoid having to download the entire resource when the cache already has a copy locally, but the browser is not sure if the resource is still fresh.

A standard HTTP response to instruct the browser to use the cached resource has the cache-control response header set as follows: the Cache-Control directive is set to a maximum age value, the Last-Modified parameter is set to a date, and the ETag parameter is set to an alphanumeric string. For example, a standard cache-control response header may be expressed as follows:

Cache-Control: max-age=3600
Last-Modified: Fri, 8 Nov. 2013 16:04:31 PST
ETag: "abctx125"

In embodiments of the present invention, the cache control method is configured to modify the cache-control response header for certain webpages in order to force cache revalidation. In some embodiments, the cache control method is applied to modify the cache-control response header by setting the Cache-Control directive to "must-revalidate," removing the Last-Modified date, and appending a suffix to the ETag parameter. For example, a modified cache-control response header may be expressed as follows:

Cache-Control: max-age=0, must-revalidate
ETag: "abctx125-b"

With the cache-control response header is thus modified, the browser receiving the response will be instructed to revalidate the cached resource before serving the resource from cache. In that case, when the cache stores only an incomplete version of a resource, such as a streamed image, the browser will fetch the full resource from the optimization proxy server so that a non-optimized webpage will render a high resolution image without undesired image artifacts.

Figure 6:
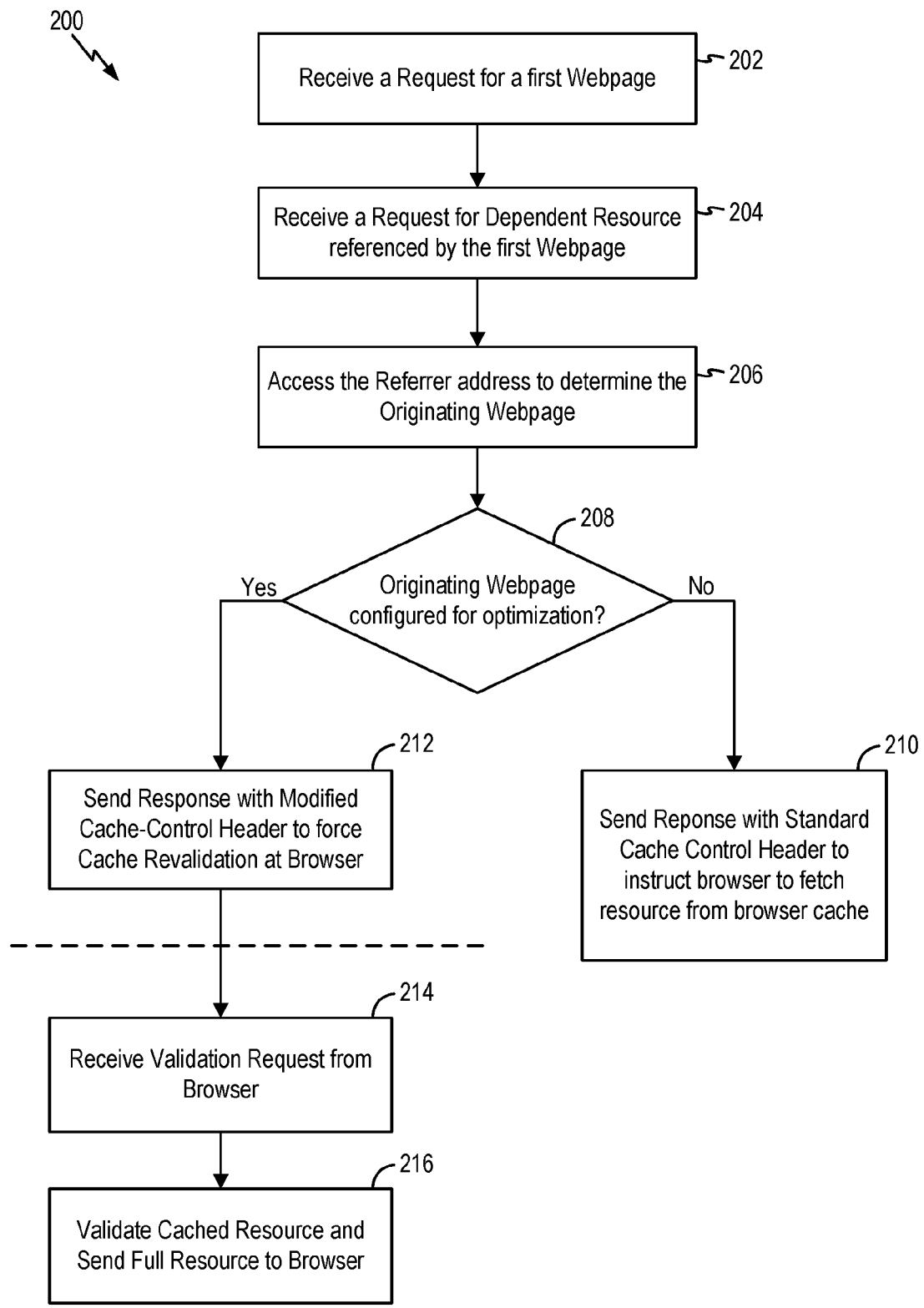
FIG. 6 is a flow chart illustrating a cache control method for partially optimized websites in embodiments of the present invention.

FIG. 6 is a flow chart illustrating a cache control method for partially optimized websites in embodiments of the present invention. In some example, the cache control method is implemented in an optimization proxy server 410 of FIG. 5 which is used to provide optimization of content delivery for at least some of the webpages of a website. Referring to FIG. 6, a cache control method 200 starts when a request for a first webpage is received from a browser (202). The method 200 then receives a request for dependent resources referenced by the first webpage (204). The method 200 accesses the referrer address to determine the webpage from which the first webpage originates from (206). The method 200 then determines whether the originating webpage is configured for optimization for content delivery (208). When a webpage is optimized for content delivery, the resources on the webpage, such as images, may be streaming in order to achieve faster rendering of the webpage.

When the originating webpage is not configured for optimization, that is, the originating webpage is a non-optimized webpage, then method 200 sends a response to the browser with a standard cache-control response header (210). The standard cache-control response header instructs the browser to fetch the resource from the browser cache.

On the other hand, when the originating webpage is configured for optimization, the method 200 sends a response to the browser with a modified cache-control response header (212). In particular, the modified cache-control response header forces the browser to request cache revalidation.

In some embodiment, the method 200 handles the cache validation for the browser. For instance, when the optimization proxy server 410 of FIG. 5 includes a cache for storing locally resources fetched from the origin server 104, the optimization proxy server 410 can validate the cached resource for the browser. In that case, the method 200 further receives a validation request from the browser (214). The method 200 validates the cached resource. Due to the values set in the cache control response header, the method 200 sends the full resolution resource to the browser (216). That is, the resource is sent to the browser without using the streaming protocol. The validation process is optional and may be omitted in other embodiments of the present invention.

The cache control method 200 of FIG. 6 is particularly advantageous when the browser has navigated from an optimized webpage to a non-optimized webpage using the same dependent resource, such as an image. When the browser was displaying the optimized webpage, the dependent resource is stream to optimize the content delivery. Accordingly, the streamed image is stored in the browser cache. Then, when the browser navigates to a non-optimized webpage having the same image, the browser would end up fetching the streamed image from the cache and displaying a non-optimal image. For example, the image may be blurry. However, when the cache control method of the present invention is applied, when the browser navigates to the non-optimized webpage, the cache control method recognizes that the browser was previously on an optimized webpage and will send a response with a modified cache control header to force the browser to revalidate the cached resource. The browser will then obtain the full resource, that is, the full resolution image, and will display the full resolution image on the non-optimized webpage. The user experience is not negatively impacted when only a subset of webpages is optimized on a website.

Figure 7:
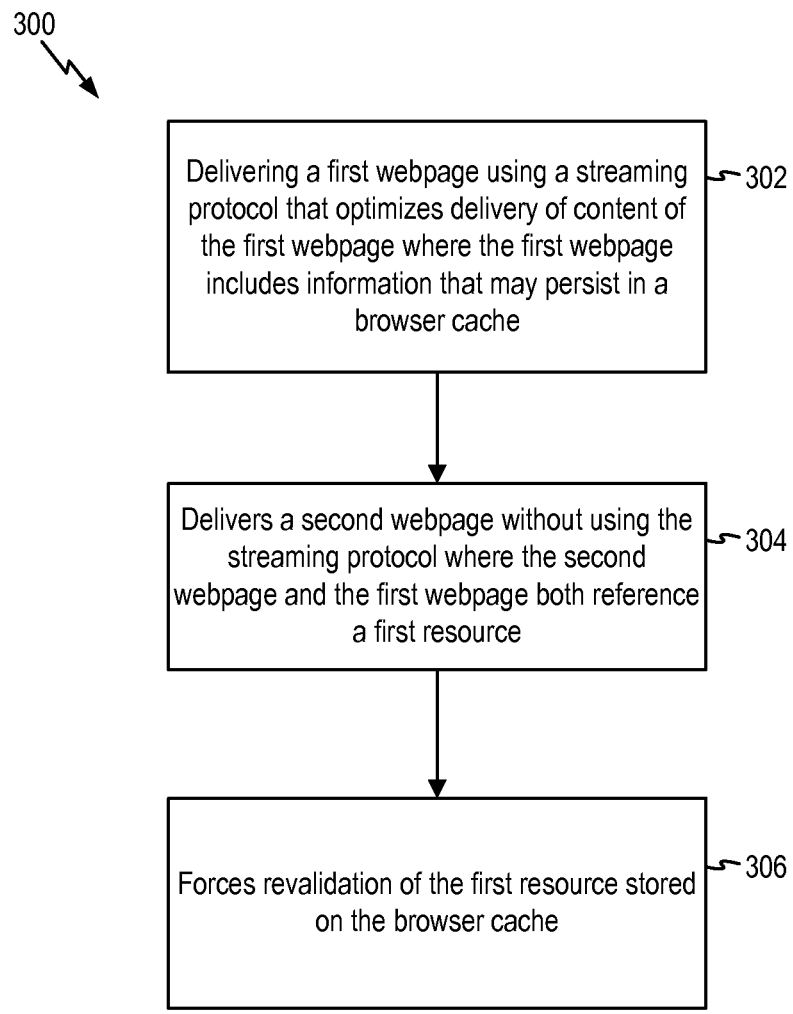
FIG. 7 is a flow chart illustrating a method to deliver webpages to a browser in embodiments of the present invention.

FIG. 7 is a flow chart illustrating a method to deliver webpages to a browser in embodiments of the present invention. Referring to FIG. 7, a method 300 starts by delivering a first webpage using a streaming protocol that optimizes delivery of content of the first webpage where the first webpage includes information that may persist in a browser cache (302). Then, at 304, the method 300 delivers a second webpage without using the streaming protocol. The second webpage and the first webpage both reference a first resource. At 306, the method 300 forces revalidation of the first resource stored on the browser cache. In some embodiment, the first resource is an image.

Furthermore, in some embodiments, the method 300 forces revalidation by receiving a request for the first resource upon delivery of the second webpage; and sending a response for the first resource having a modified cache control response header. The modified cache control response header has one or more cache control parameters set to values that cause the browser to revalidate the first resource stored on the browser cache. In embodiment, the modified cache control response header includes a cache-control directive having a value of "max-age=0, must-revalidate", a last-modified parameter with the previous value removed, and an ETag parameter with an identifier added to a previous value.

According to another aspect of the present invention, a website optimization method is provided to automatically determine whether to optimize a webpage for a website. In one embodiment, the website redirects all its network traffic through the optimization proxy server. The optimization proxy server may delivery the webpages with optimization and without optimization. The browser uses its performance counter to measure how long it takes to load the webpages. The optimization proxy server collects timing data from the browser and analyzes the loading time data for the webpages. For instance, the optimization proxy server may first send all the webpages without optimization and collects the performance data. Then, the proxy server sends all the webpages with optimization and collects the performance data. Based on the collected data, the website optimization method determines dynamically which webpage should be optimized for content delivery and which webpage does not require optimization.

In other embodiments, the website optimization method may test the webpages of a website and collect the loading time data for all the webpages. The method obtains a histogram of the loading time of the webpages and select webpages for optimization based on the histogram data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of delivering webpages to a browser where the webpages include information that may persist in a browser cache, comprising:

receiving, at a proxy server, a request for a first webpage from the browser, the first webpage being configured without an optimization client to deliver content without using content delivery optimization techniques, the first webpage referencing a first resource;

delivering, from the proxy server to the browser, the first webpage without using content delivery optimization techniques;

in response to the first webpage being delivered to the browser, receiving, at the proxy server, a request for the first resource referenced by the first webpage from the browser;

accessing, at the proxy server, a referrer address of the first webpage to determine an originating webpage from which the first webpage originates, the first webpage being a different webpage from the originating webpage;

in response to a determination that the originating webpage contains the optimization client and is configured to optimize delivery of content, sending, from the proxy server to the browser, a response with a modified cache control header to instruct the browser to revalidate the first resource;

after sending the response with the modified cache control header and in response to a request from the browser, delivering, from the proxy server, a full content of the first resource to the browser for display on the first webpage; and in response to a determination that the originating webpage does not contain the optimization client and is not configured to optimize delivery of content, sending, from the proxy server to the browser, a response with a standard cache control header to instruct the browser to fetch the first resource from the browser cache.

2. The method of claim 1, further comprising:
receiving, at the proxy server, a validation request for the first resource from the browser;
validating, at the proxy server, the first resource; and
sending, from the proxy server, the first resource in full resolution to the browser.

3. The method of claim 1, wherein the first resource comprises a first image.

4. The method of claim 1, wherein sending, from the proxy server to the browser, the response with the modified cache control header to instruct the browser to revalidate the first resource stored on the browser cache comprises:
sending, from the proxy server to the browser, the response for the first resource having the modified cache control response header, the modified cache control response header having one or more cache control parameters set to values that cause the browser to revalidate the first resource.

5. The method of claim 4, wherein sending, from the proxy server to the browser, the response for the first resource having the modified cache control response header comprises:
sending, from the proxy server to the browser, the response for the first resource having the modified cache control response header including a cache-control directive having a value of "max-age=0, must-revalidate", a last-modified parameter with a previous value removed, and an ETag parameter with an identifier added to a previous value.

6. A system for delivering webpages to a browser where the webpages include information that may persist in a browser cache, comprising:
a processor; and
a memory coupled with the processor, wherein the memory is configured to provide the processor with instructions which when executed cause the processor to:

receive, at the processor, a request for a first webpage from the browser, the first webpage being configured without an optimization client to deliver content without using content delivery optimization techniques, the first webpage referencing a first resource;

deliver, from the processor to the browser, the first webpage without using content delivery optimization techniques;

in response to the first webpage being delivered to the browser, receive, at the processor, a request for the first resource referenced by the first webpage from the browser;

access, at the processor, a referrer address of the first webpage to determine an originating webpage from which the first webpage originates, the first webpage being a different webpage from the originating webpage;

in response to a determination that the originating webpage contains the optimization client and is configured to optimize delivery of content, send, from the processor to the browser, a response with a modified cache control header to instruct the browser to revalidate the first resource;

in response to a request from the browser after sending the response with the modified cache control header, deliver, from the processor, a full content of the first resource from the browser cache to the browser for display on the first webpage; and in response to a determination that the originating webpage does not contain the optimization client and is not configured to optimize delivery of content, sending, from the processor to the browser, a response with a standard cache control header to instruct the browser to fetch the first resource from the browser cache.

7. A method of delivering webpages to a browser, comprising:
delivering, from a proxy server, a plurality of webpages of a website to a browser, wherein the plurality of webpages include information that may persist in a browser cache;
receiving, at the proxy server, a request for a first webpage of the web site referencing a first resource from the browser;
determining, at the proxy server, the first webpage does not contain an optimization client and is to be delivered without using content delivery optimization techniques;
delivering, from the proxy server, the first webpage to the browser;
in response to the first webpage being delivered to the browser, receiving, at the proxy server, a request for the first resource referenced by the first webpage from the browser;
determining, at the proxy server, an originating webpage from which the first webpage originates, the first webpage being a different webpage from the originating webpage;
determining, at the proxy server, the originating webpage as containing the optimization client and being delivered using a content delivery optimization technique comprising a streaming protocol;
in response to the determining that the originating webpage was delivered using the content delivery optimization technique, sending, from the proxy server to the browser, a response to the request for the first resource, the response comprising an instruction to force revalidation of the first resource;
in response to receiving a validation request from the browser, delivering, from the proxy server, a full content of the first resource to the browser for display on the first webpage;
determining, at the proxy server, the originating webpage as not containing the optimization client and being delivered without using content delivery optimization techniques; and
in response to the determining that the originating webpage was delivered without using content delivery optimization techniques, sending, from the proxy server to the browser, a response to the request for the first resource, the response comprising an instruction to fetch the first resource from the browser cache.

8. The method of claim 7, further comprising:
prior to receiving the request for the first webpage, delivering, from the proxy server, the originating webpage to the browser using the streaming protocol, the originating webpage referencing the first resource, wherein the first resource is streamed to the browser and the streamed resource may persist in the browser cache.

9. The method of claim 7, wherein the first resource comprises a first image and the streamed resource comprises a streamed image and wherein delivering, from the proxy server, the full content of the first resource to the browser for display on the first webpage comprises:
delivering the first image having a full resolution to the browser for display on the first webpage.

10. The method of claim 7, wherein sending, from the proxy server to the browser, the response to the request for the first resource, the response comprising an instruction to force revalidation of the first resource, comprises:
sending, from the proxy server to the browser, the response for the request for the first resource having a modified cache control response header, the modified cache control response header having one or more cache control parameters set to values that cause the browser to revalidate the first resource that may be stored on the browser cache.

11. The method of claim 10, wherein sending, from the proxy server to the browser, the response for the request for the first resource having the modified cache control response header comprises:
sending, from the proxy server to the browser, the response for the request for the first resource having the modified cache control response header including a cache-control directive having a value of "max-age=0, must-revalidate", a last-modified parameter with a previous value removed, and an ETag parameter with an identifier added to a previous value.

12. The method of claim 7, wherein determining, at the proxy server, the originating webpage from which the first webpage originates comprises:
determining, at the proxy server, the originating webpage from which the first webpage originates by accessing the referrer address of the first webpage.

13. A system for delivering webpages to a browser, comprising:
a processor; and
a memory coupled with the processor, wherein the memory is configured to provide the processor with instructions which when executed cause the processor to:

deliver, from the processor, a plurality of webpages of a website to a browser, wherein the plurality of webpages includes information that may persist in a browser cache;
receive, at the processor, a request for a first webpage of the web site referencing a first resource from the browser;
determine, at the processor, the first webpage does not contain an optimization client and is to be delivered without using content delivery optimization techniques;
delivering, from the processor, the first webpage to the browser;
in response to the first webpage being delivered to the browser, receive, at the processor, a request for the first resource referenced by the first webpage from the browser;
determine, at the processor, an originating webpage from which the first webpage originates, the first webpage being a different webpage from the originating webpage;
determine, at the processor, the originating webpage as containing the optimization client and being delivered using a content delivery optimization technique comprising a streaming protocol;
in response to the determining that the originating webpage was delivered using the content delivery optimization technique, send, from the processor to the browser, a response to the request for the first resource, the response comprising an instruction to force revalidation of the first resource;
in response to receiving a validation request from the browser, deliver, from the processor, a full content of the first resource to the browser for display on the first webpage;
determine, at the processor, the originating webpage as not containing the optimization client and being delivered without using content delivery optimization techniques; and
in response to the determining that the originating webpage was delivered without using content delivery optimization techniques, send, from the processor to the browser, a response to the request for the first resource, the response comprising an instruction to fetch the first resource from the browser cache.

14. The system recited in claim 13, wherein the memory is further configured to provide the processor with instructions which when executed cause the processor to:
prior to receiving the request for the first webpage, deliver, from the proxy server, the originating webpage to the browser using the streaming protocol, the originating webpage referencing the first resource, wherein the first resource is streamed to the browser and the streamed resource may persist in the browser cache.

15. The system recited in claim 13, wherein the memory is further configured to provide the processor with instructions which when executed cause the processor to:
send, from the processor to the browser, the response for the request for the first resource having a modified cache control response header, the modified cache control response header having one or more cache control parameters set to values that cause the browser to revalidate the first resource that may be stored on the browser cache.

16. A computer program product for delivering webpages to a browser, the computer program product being embodied in a tangible and non-transitory computer readable storage medium and comprising computer instructions for:

delivering, from a proxy server, a plurality of webpages of a website to a browser, wherein the plurality of webpages include information that may persist in a browser cache;

receiving, at the proxy server, a request for a first webpage of the web site referencing a first resource from the browser;

determining, at the proxy server, the first webpage does not contain an optimization client and is to be delivered without using content delivery optimization techniques;

delivering, from the proxy server, the first webpage to the browser;

in response to the first webpage being delivered to the browser, receiving, at the proxy server, a request for the first resource referenced by the first webpage from the browser;

determining, at the proxy server, an originating webpage from which the first webpage originates, the first webpage being a different webpage from the originating webpage;

determining, at the proxy server, the originating webpage as containing the optimization client and being delivered using a content delivery optimization technique comprising a streaming protocol;

in response to the determining that the originating webpage was delivered using the content delivery optimization technique, sending, from the proxy server to the browser, a response to the request for the first resource, the response comprising an instruction to force revalidation of the first resource;

in response to receiving a validation request from the browser, delivering, from the proxy server, a full content of the first resource to the browser for display on the first webpage;

determining, at the proxy server, the originating webpage as not containing the optimization client and being delivered without using content delivery optimization techniques; and in response to the determining that the originating webpage was delivered without using content delivery optimization techniques, sending, from the proxy server to the browser, a response to the request for the first resource, the response comprising an instruction to fetch the first resource from the browser cache.

17. The computer program product recited in claim 16, further comprising computer instructions for:

sending, from the proxy server to the browser, the response for the request for the first resource having the modified cache control response header including a cache-control directive having a value of "max-age=0, must-revalidate", a last-modified parameter with a previous value removed, and an ETag parameter with an identifier added to a previous value.

* * * * *